United States Patent
Stewart et al.

(10) Patent No.: US 7,217,914 B2
(45) Date of Patent: May 15, 2007

(54) METHOD FOR CALIBRATING AN OPTOELECTRONIC DEVICE BASED ON APD BREAKDOWN VOLTAGE

(75) Inventors: James Stewart, San Jose, CA (US); Anthony Ho, Sunnyvale, CA (US); Rudolf J. Hofmeister, Sunnyvale, CA (US); Darin James Douma, Monrovia, CA (US); Lucy G. Hosking, Santa Cruz, CA (US); Andreas Weber, Los Altos, CA (US); Jeffrey Bryant Price, Sunnyvale, CA (US)

(73) Assignee: Finisar Corporation, Sunnyvale, CA (US)

(*) Notice: Subject to any disclaimer, the term of this patent is extended or adjusted under 35 U.S.C. 154(b) by 73 days.

(21) Appl. No.: 10/899,904

(22) Filed: Jul. 27, 2004

(65) Prior Publication Data

US 2005/0006567 A1    Jan. 13, 2005

Related U.S. Application Data

(62) Division of application No. 10/101,258, filed on Mar. 18, 2002.

(60) Provisional application No. 60/357,075, filed on Feb. 12, 2002.

(51) Int. Cl.
*H01J 40/14* (2006.01)
*H01L 35/00* (2006.01)
*H02H 5/04* (2006.01)

(52) U.S. Cl. .................. 250/214 R; 327/513; 361/93.8

(58) Field of Classification Search ............ 250/214 R, 250/214.1, 238; 327/514; 361/93.8
See application file for complete search history.

(56) References Cited

U.S. PATENT DOCUMENTS

| 4,292,514 A | | 9/1981 | Ohtomo |
| 5,270,533 A | * | 12/1993 | Pulice .................... 250/214 R |
| 5,278,404 A | | 1/1994 | Yeates |
| 5,929,982 A | | 7/1999 | Anderson |
| 5,953,690 A | * | 9/1999 | Lemon et al. ............... 702/191 |
| 6,157,022 A | * | 12/2000 | Maeda et al. ............ 250/214 R |
| 6,313,459 B1 | * | 11/2001 | Hoffe et al. ............ 250/214 R |
| 6,888,863 B1 | | 5/2005 | Chen et al. |
| 2005/0001152 A1 | | 1/2005 | Stewart et al. |

FOREIGN PATENT DOCUMENTS

| EP | 0856943 | 8/1998 |
| EP | 1006591 | 6/2000 |

* cited by examiner

*Primary Examiner*—Stephone B. Allen
(74) *Attorney, Agent, or Firm*—Workman Nydegger

(57) ABSTRACT

Methods and processes are disclosed for calibrating optoelectronic devices, such as optoelectronic transceivers and optoelectronic receivers, based upon an avalanche photodiode breakdown voltage. In general, the method involves adjusting a reverse-bias voltage of the avalanche photodiode until avalanche breakdown of the avalanche photodiode occurs. An optimized APD reverse-bias voltage is then determined by reducing the reverse-bias voltage at which avalanche breakdown occurs by a predetermined offset voltage. This process is performed at a variety of different temperatures. Information concerning each temperature and the corresponding optimized APD reverse-bias voltage is stored in a memory of the optoelectronic device.

20 Claims, 10 Drawing Sheets

METHOD FOR CALIBRATING AN OPTOELECTRONIC DEVICE BASED ON APD BREAKDOWN VOLTAGE

RELATED APPLICATIONS

This application is a division, and claims the benefit, of U.S. patent application Ser. No. 10/101,258, entitled AVALANCHE PHOTODIODE CONTROLLER CIRCUIT FOR FIBER OPTICS TRANSCEIVER, filed Mar. 18, 2002 which, in turn, claims the benefit of U.S. Provisional Patent Application Ser. No. 60/357,075 entitled AVALANCHE PHOTODIODE CONTROLLER CIRCUIT FOR FIBER OPTICS TRANSCEIVER, filed Feb. 12, 2002, both of which are incorporated herein in their respective entireties by this reference.

BACKGROUND OF THE INVENTION

Field of the Invention

This invention generally relates to methods for calibrating optical components. More particularly, embodiments of the invention are concerned with methods and processes for calibrating an optoelectronic device, based upon an avalanche photodiode breakdown voltage.

FIG. 1 shows a schematic representation of the essential features of a typical prior-art fiber optic transceiver. The main circuit 1 contains at a minimum transmit and receive circuit paths and power 19 and ground connections 18. The receiver circuit typically consists of a Receiver Optical Subassembly (ROSA) 2 which contains a mechanical fiber receptacle and coupling optics as well as a photodiode and pre-amplifier (preamp) circuit. The ROSA is in turn connected to a post-amplifier (postamp) integrated circuit 4, the function of which is to generate a fixed output swing digital signal which is connected to outside circuitry via the RX+ and RX− pins 17. The postamp circuit 4 also often provides a digital output signal known as Signal Detect or Loss of Signal indicating the presence or absence of suitably strong optical input. The Signal Detect output is provided at output pin 18. The transmit circuit will typically consist of a Transmitter Optical Subassembly (TOSA) 3 and a laser driver integrated circuit 5. The TOSA contains a mechanical fiber receptacle and coupling optics as well as a laser diode or LED. The laser driver circuit will typically provide AC drive and DC bias current to the laser. The signal inputs for the AC driver are obtained from the TX+ and TX− pins 12. The laser driver circuitry typically will require individual factory setup of certain parameters such as the bias current (or output power) level and AC modulation drive to the laser. Typically this is accomplished by adjusting variable resistors or placing factory selected resistors 7, 9 (i.e., having factory selected resistance values). Additionally, temperature compensation of the bias current and modulation is often required. This function can be integrated in the laser driver integrated circuit or accomplished through the use of external temperature sensitive elements such as thermistors 6, 8.

In addition to the most basic functions described above, some transceiver platform standards involve additional functionality. Examples of this are the TX disable 13 and TX fault 14 pins described in the GBIC (Gigabit Interface Converter) standard. In the GBIC standard (SFF-8053), the TX disable pin allows the transmitter to be shut off by the host device, while the TX fault pin is an indicator to the host device of some fault condition existing in the laser or associated laser driver circuit. In addition to this basic description, the GBIC standard includes a series of timing diagrams describing how these controls function and interact with each other to implement reset operations and other actions. Most of this functionality is aimed at preventing non-eyesafe emission levels when a fault conditions exists in the laser circuit. These functions may be integrated into the laser driver circuit itself or in an optional additional integrated circuit 11. Finally, the GBIC standard for a Module Definition "4" GBIC also requires the EEPROM 10 to store standardized ID information that can be read out via a serial interface (defined as using the serial interface of the ATMEL AT24C01A family of EEPROM products) consisting of a clock 15 and data 16

As an alternative to mechanical fiber receptacles, some prior art transceivers use fiber optic pigtails which are unconnectorized fibers.

Similar principles clearly apply to fiber optic transmitters or receivers that only implement half of the transceiver functions.

It is desirable to use avalanche photodiodes in some transceivers, because avalanche photodiodes have a sensitivity that is 10 dB greater than the sensitivity of the PIN diodes that have been used in previous transceivers. Avalanche photodiodes are characterized by avalanche breakdowns, which occur when the reverse-bias voltage applied to a particular avalanche photodiode is set to a particular value. The sensitivity of an avalanche diode is maximized when it is operated at a reverse-bias voltage that is a small increment below its avalanche voltage, which typically is approximately −50 volts. Unfortunately, avalanche voltages vary from one device to the next, and they also vary as a function of the temperature of the particular device. Therefore, to achieve maximum sensitivity, either the temperature of an avalanche photodiode must be controlled or else the reverse-bias voltage applied to the avalanche photodiode must be adjusted for different operating temperatures.

One prior art approach uses thermistors whose electrical resistance changes as a function of temperature to control the reverse-bias voltage applied to the avalanche photodiode. Under high-volume manufacturing conditions, however, this approach is not desirable because each receiver/transceiver has to be manually tuned to account for variations among thermistors and photodiodes.

Another prior art approach uses a temperature controller to maintain a steady operating temperature for the avalanche photodiode. This approach, however, is generally not feasible for pluggable optoelectronic transceivers/receivers because temperature controllers are typically too big to fit within such devices. For example, the dimensions for a pluggable optoelectronic transceiver specified by GBIC (Gigabit Interface Converter) standards are 1.2"×0.47"×2.6", and the dimensions for an optoelectronic transceiver specified by SFP (Small Form Factor Pluggable) standards are 0.53"×0.37"×2.24". As pluggable optoelectronic transceivers/transmitters become more and more compact, the use of temperature controller in these devices is becoming less and less feasible.

Accordingly, what is needed is a method and system to maintain desirable sensitivity of an avalanche photodiode over temperature variations.

BRIEF SUMMARY OF AN EXEMPLARY EMBODIMENT OF THE INVENTION

In one exemplary embodiment, a calibration method is employed that is suited for use in the calibration of optoelectronic devices, such as optoelectronic transceivers and"

optoelectronic receivers, based upon an avalanche photodiode breakdown voltage. In general, the method involves adjusting a reverse-bias voltage of the avalanche photodiode until avalanche breakdown of the avalanche photodiode occurs. An optimized APD reverse-bias voltage is then determined by reducing the reverse-bias voltage at which avalanche breakdown occurs by a predetermined offset voltage. This process is performed at a variety of different temperatures. Information concerning each temperature and the corresponding optimized APD reverse-bias voltage is stored as a temperature lookup table in a memory of the optoelectronic device. An IC controller of the optoelectronic device then accesses the temperature lookup table during laser operations and uses the information to implement temperature compensated laser control and performance.

BRIEF DESCRIPTION OF THE DRAWINGS

For a better understanding of the invention, reference should be made to the following detailed description taken in conjunction with the accompanying drawings, in which.

DESCRIPTION OF PREFERRED EMBODIMENTS

Preferred embodiments of the invention are described below. In the interest of clarity, not all features of an actual implementation are described. It will be appreciated that in the development of any such embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
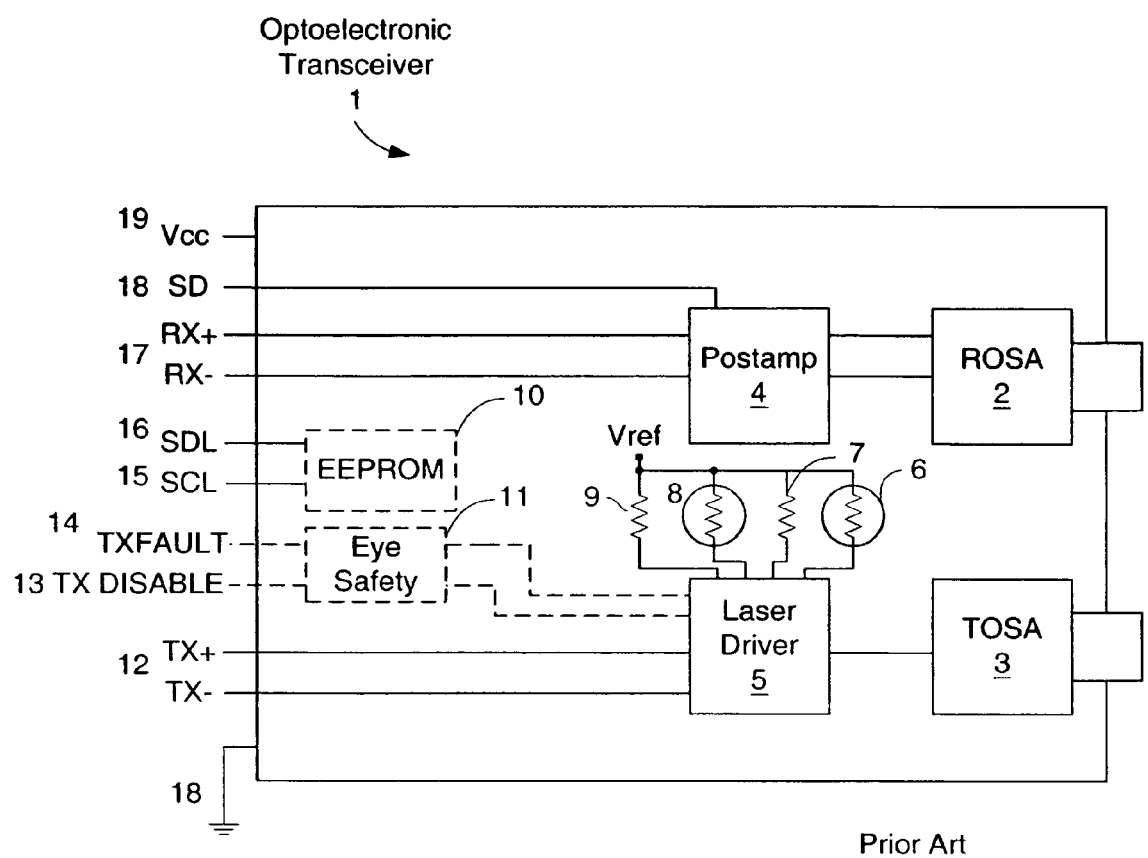
FIG. 1 is a block diagram of a prior art optoelectronic transceiver.
Figure 2:
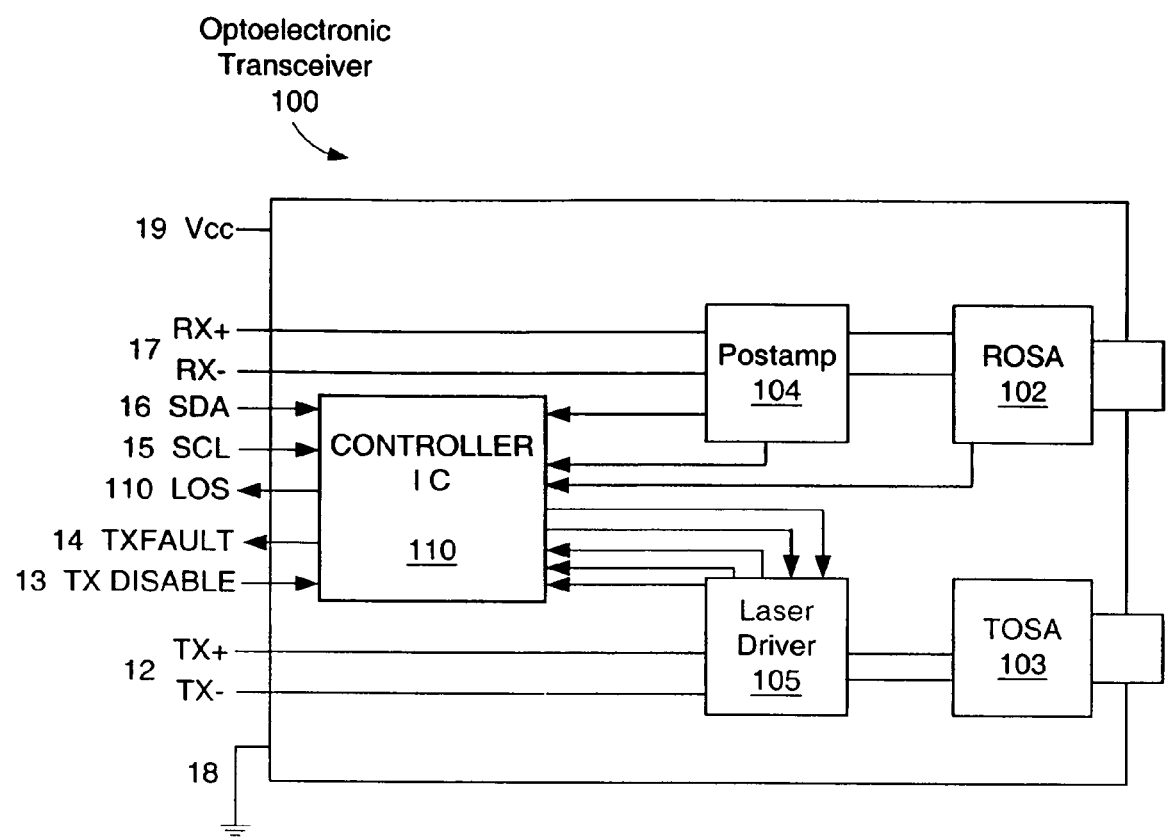
FIG. 2 is a block diagram of an optoelectronic transceiver in accordance with the present invention.
Figure 3:
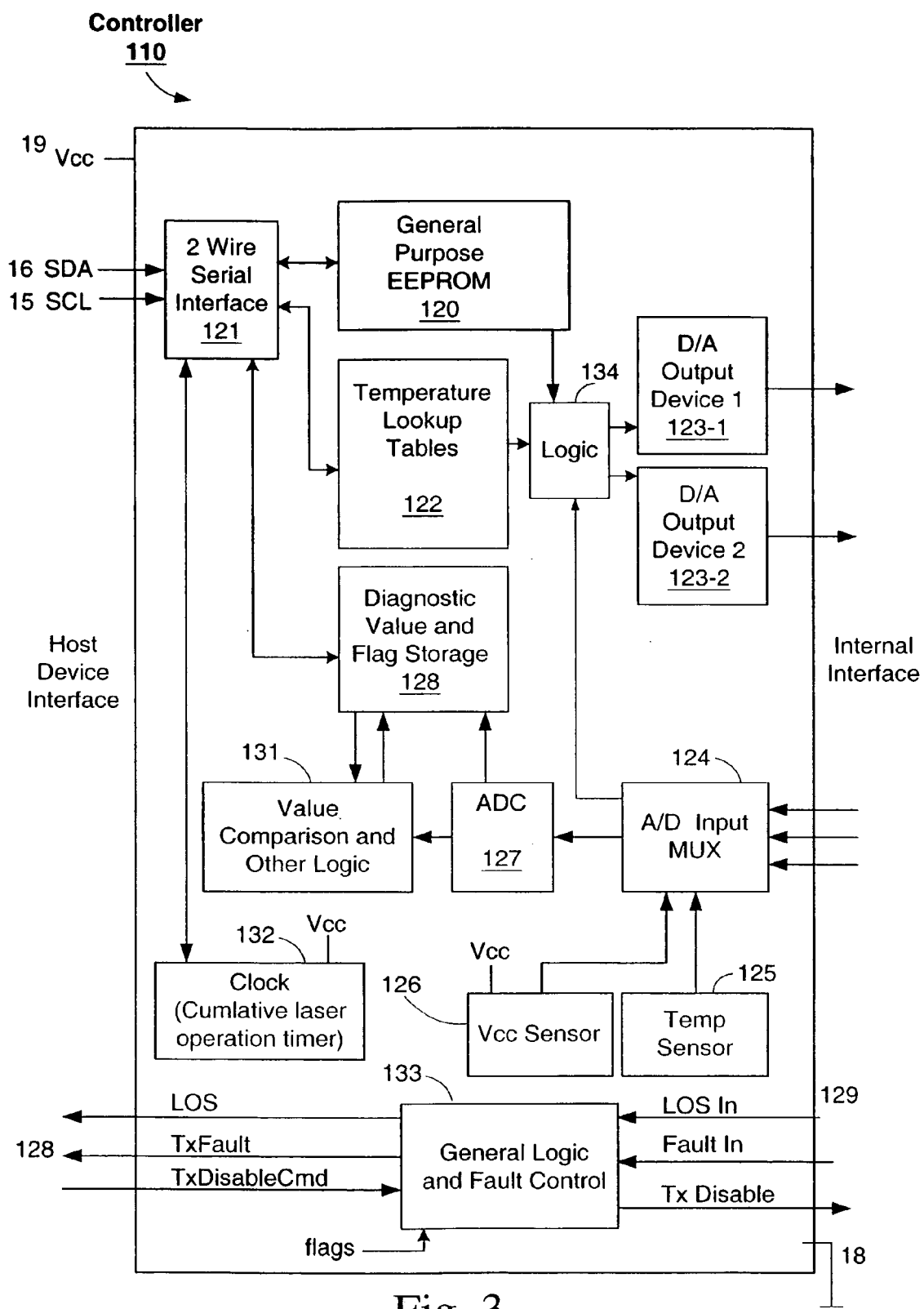
FIG. 3 is a block diagram of modules within the controller IC of the optoelectronic transceiver of FIG. 2.

A transceiver 100 based on the present invention is shown in FIGS. 2 and 3. The transceiver 100 contains a Receiver Optical Subassembly (ROSA) 102 and Transmitter Optical Subassembly (TOSA) 103 along with associated post-amplifier 104 and laser driver 105 integrated circuits that communicate the high speed electrical signals to the outside world. Other control and setup functions are implemented with a third single-chip integrated circuit 110 called the controller IC. All the components of the transceiver 100 are preferably located in a protective housing 212 except for connectors that may protrude from the housing. Suitable housings, including metallic, plastic, potting box and other housing structures are well known in the art.

The controller IC 110 handles all low speed communications with a host device. These include the standardized pin functions such as Loss of Signal (LOS) 111, Transmitter Fault Indication (TX FAULT) 14, and the Transmitter Disable Input (TXDIS) 13. The controller IC 110 has a two wire serial interface 121, also called the memory interface, for reading and writing to memory mapped locations in the controller.

The interface 121 is coupled to host device interface input/output lines, typically clock (SCL) and data (SDA) lines, 15 and 16. In one embodiment, the serial interface 121 operates in accordance with the two wire serial interface standard that is also used in the GBIC and SFP (Small Form Factor Pluggable) standards. Other interfaces could be used in alternate embodiments. The two wire serial interface 121 is used for all setup and querying of the controller IC 110, and enables access to the optoelectronic transceiver's control circuitry as a memory mapped device. That is, tables and parameters are set up by writing values to predefined memory locations of one or more nonvolatile memory devices 120, 122, 128 (e.g., EEPROM devices) in the controller, whereas diagnostic and other output and status values are output by reading predetermined memory locations of the same nonvolatile memory devices 120, 121, 122. This technique is consistent with currently defined serial ID functionality of many transceivers where a two wire serial interface is used to read out identification and capability data stored in an EEPROM.

It is noted here that some of the memory locations in the memory devices 120, 122, 128 are dual ported, or even triple ported in some instances. That is, while these memory mapped locations can be read and in some cases written via the serial interface 121, they are also directly accessed by other circuitry in the controller IC 110. For instance, certain "margining" values stored in memory 120 are read and used directly by logic 134 to adjust (i.e., scale upwards or downwards) drive level signals being sent to the digital to analog output devices 123. Similarly, there are flags stored memory 128 that are (A) written by logic circuit 131, and (B) read directly by logic circuit 133. An example of a memory mapped location not in the memory devices but that is effectively dual ported is the output or result register of clock 132. In this case the accumulated time value in the register is readable via the serial interface 121, but is written by circuitry in the clock circuit 132.

In addition to the result register of the clock 132, other memory mapped locations in the controller may be implemented as registers at the input or output of respective sub-circuits of the controller. For instance, the margining values used to control the operation of logic 134 may be stored in registers in or near logic 134 instead of being stored within memory device 128.

As shown in FIGS. 2 and 3, the controller IC 110 has connections to the laser driver 105 and receiver components. These connections serve multiple functions. The controller IC 110 has a multiplicity of digital to analog converters 123. In one embodiment the digital to analog converters are implemented as current sources, but in other embodiments the digital to analog converters may be implemented using voltage sources, and in yet other embodiments the digital to analog converters may be implemented using digital potentiometers. In some embodiments, the output signals of the digital to analog converters are used to control key parameters of the laser driver circuit 105. In one embodiment, outputs of the digital to analog converters 123 are used to directly control the laser bias current as well as to control the AC modulation level to the laser (constant bias operation). In another embodiment, the outputs of the digital to analog converters 123 of the controller IC 110 control the level of average output power of the laser driver 105 in addition to the AC modulation level (constant power operation).

In some embodiments, the controller IC 110 includes mechanisms to compensate for temperature dependent characteristics of the laser. This is implemented in the controller IC 110 through the use of temperature lookup tables 122 that are used to assign values to the control outputs as a function of the temperature measured by a temperature sensor 125 within the controller IC 110. In other embodiments, the controller IC 110 may use digital to analog converters with voltage source outputs or may even replace one or more of the digital to analog converters 123 with digital potentiometers to control the characteristics of the laser driver 105. It should also be noted that while FIG. 2 refers to a system where the laser driver 105 is specifically designed to accept inputs from the controller IC 110, it is possible to use the controller IC 110 with many other laser driver ICs to control their output characteristics.

In addition to the connection from the controller IC 110 to the laser driver 105, FIG. 2 shows a number of connections from the laser driver 105 to the controller IC 110, as well as similar connections from the ROSA 106 and Postamp 104 to the controller IC 110. These are analog monitoring connections that the controller IC 110 uses to provide diagnostic feedback to the host device via memory mapped locations in the controller IC. The controller IC 110 in one embodiment has a multiplicity of analog inputs. The analog input signals indicate operating conditions of the transceiver and/or receiver circuitry. These analog signals are scanned by a multiplexer 124 and converted using an analog to digital converter (ADC) 127. The ADC 127 has 12 bit resolution in one embodiment, although ADC's with other resolution levels may be used in other embodiments. The converted values are stored in predefined memory locations, for instance in the diagnostic value and flag storage device 128 shown in FIG. 3, and are accessible to the host device via memory reads. These values are calibrated to standard units (such as millivolts or microwatts) as part of a factory calibration procedure.

The digitized quantities stored in memory mapped locations within the controller IC include, but are not limited to, the laser bias current, transmitted laser power, and received power as well corresponding limit values, flag values, and configuration values (e.g., for indicating the polarity of the flags).

As shown in FIG. 3, the controller IC 110 includes a voltage supply sensor 126. An analog voltage level signal generated by this sensor is converted to a digital voltage level signal by the ADC 127, and the digital voltage level signal is stored in memory 128. Similarly, the temperature sensor 125 in the controller IC 110 generates a signal that is converted by the ADC 127 into a digital temperature level signal, and the digital temperature level signal is stored in memory 128. In one embodiment, the analog to digital input mux 124 and ADC 127 are controlled by a clock signal so as to automatically, periodically convert the monitored signals into digital signals, and to store those digital values in memory 128.

Figure 4:
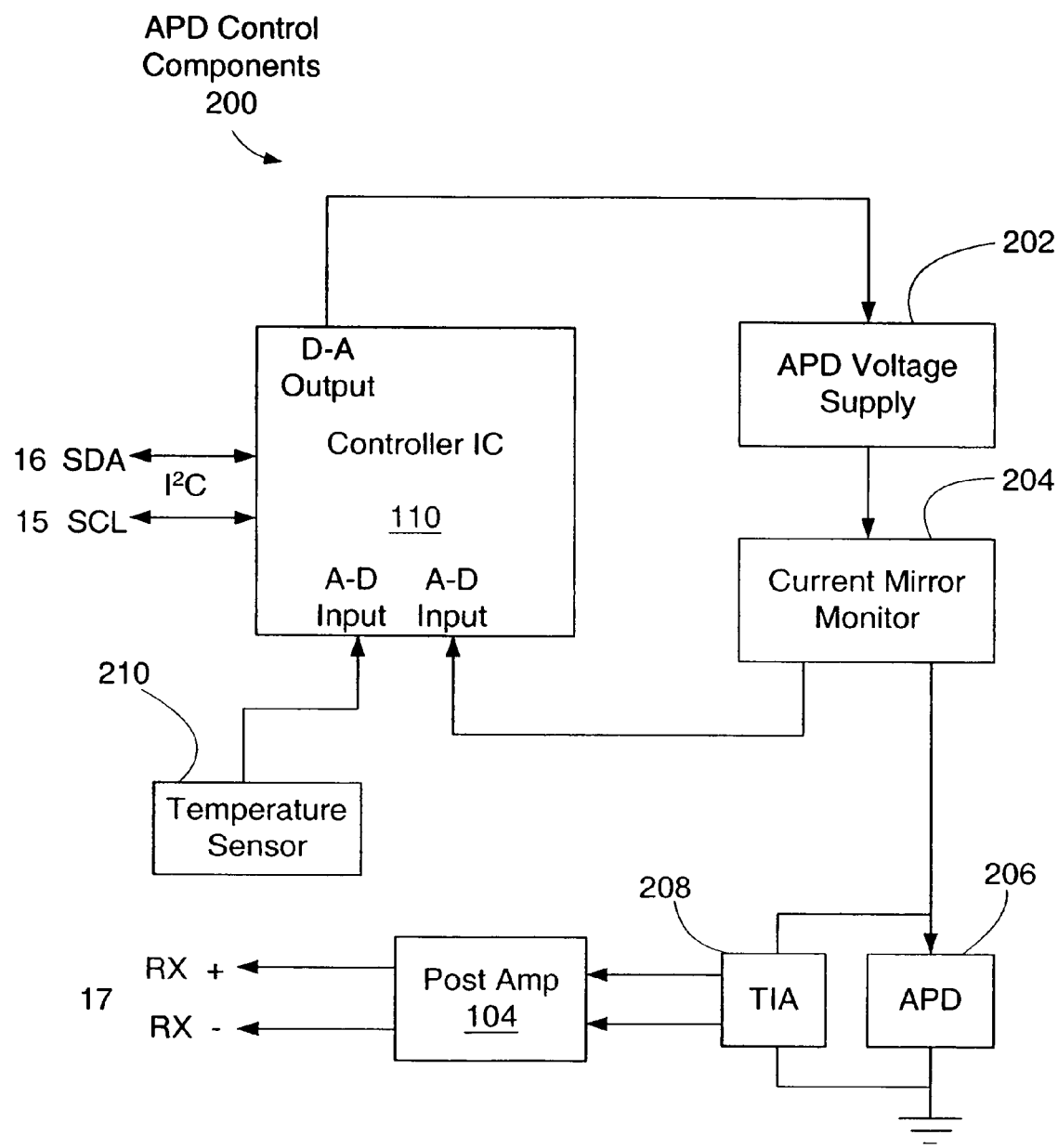
FIG. 4 is a block diagram of components of an optoelectronic transceiver having an avalanche photodiode in accordance with an embodiment of the present invention.

FIG. 4 illustrates components of an optoelectronic transceiver having an avalanche photodiode in accordance with an embodiment of the present invention. These components are all located within the transceiver housing 212 (FIG. 2). In the embodiment in FIG. 4, the controller IC 110 regulates the reverse-bias voltage applied to an avalanche photodiode 206. As is well known in the art, if the reverse-bias voltage applied to an avalanche photodiode is increased, an avalanche breakdown will eventually occur at a characteristic avalanche voltage $V_A$. The avalanche voltage $V_A$ is typically in a range between 40 volts and 70 volts at room temperature, and it varies from one device to another and also as a (generally increasing) function of the temperature of the avalanche photodiode. The sensitivity of an avalanche photodiode is maximized when it is operated at a reverse-bias voltage $V_{APD}$ that is less than the avalanche voltage $V_A$ by an offset voltage that is relatively small (approximately 1 volt for some avalanche photodiodes). The controller IC 110 may be used to regulate the reverse-bias voltage $V_{APD}$ applied to an avalanche photodiode so that the maximum sensitivity of the avalanche photodiode is maintained over a range of temperatures.

Figure 5:
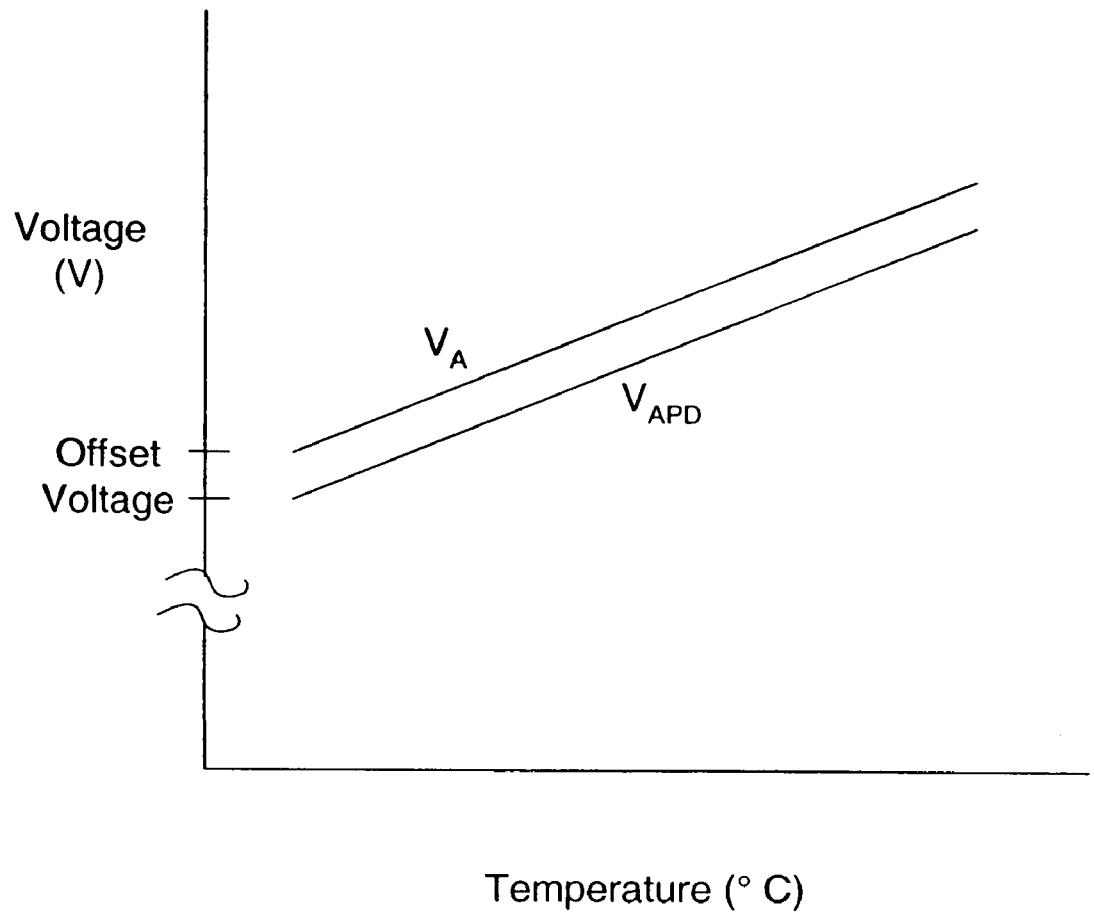
FIG. 5 is a graph of the avalanche voltage and optimal reverse-bias voltage for a typical avalanche photodiode plotted as a function of temperature.

FIG. 5 is a graph showing the avalanche voltage $V_A$ and the optimal reverse-bias voltage $V_{APD}$ plotted as a function of temperature for a typical avalanche photodiode. As shown in FIG. 5, the lines representing the avalanche voltage $V_A$ and the optimal reverse-bias voltage $V_{APD}$ are separated by an offset voltage. The offset voltage shown in FIG. 5 is constant, but it may vary with the temperature.

Referring again to FIG. 4, the controller IC 110 outputs a signal to an APD power supply circuit 202 that provides a reverse-bias voltage for an avalanche photodiode 206. A current mirror monitor circuit 204 is coupled between the APD power supply circuit 202 and the avalanche photodiode 206. The current mirror monitor 204 passes the reverse-bias current to the avalanche photodiode 206 and also produces a mirrored current signal that is provided as an input to the controller IC 110. The current mirror signal is proportional to the current passing through the avalanche photodiode 206, which is also proportional to the received power of the avalanche photodiode 206. The current mirror signal is used to monitor the received power of the avalanche photodiode 206 during operation, and sense avalanche breakdown during calibration of the optoelectronic transceiver 100. The output signal from the avalanche photodiode 206 is amplified by a transimpedance amplifier (TIA) 208 and then amplified by a post-amplifier (postamp) integrated circuit 104. The postamp 104 generates a fixed output swing digital signal which is connected to outside circuitry via the RX+ and RX− pins 17.

The controller IC 110 also receives a temperature input signal from a temperature sensor 210. The temperature sensor may be incorporated into the controller IC 110 or, as shown in FIG. 4, it maybe a separate device with the transceiver housing 212. The controller IC 110 is coupled to a host device through an interface 121 (FIG. 3) connected to input/output lines, typically clock (SCL) and data (SDA) lines, 15 and 16. As shown in FIG. 3, the controller IC 110 includes a General Purpose EEPROM 120 (FIG. 3) and a temperature lookup table 122 (FIG. 3) located therein. Referring to Memory Map Table 1, the temperature lookup table 122 (FIG. 3) may be situated in Array 4 or Array 5 in the memory.

The temperature lookup table 122 (FIG. 3) stores control value entries for the avalanche photodiode 206 for a range of temperatures. These correspond to the optimal reverse-bias voltages $V_{APD}$ shown in FIG. 5. Each control value entry represents the reverse-bias voltage that must be applied to the avalanche photodiode 206 at a particular temperature in order to maximize its sensitivity.

Figure 6:
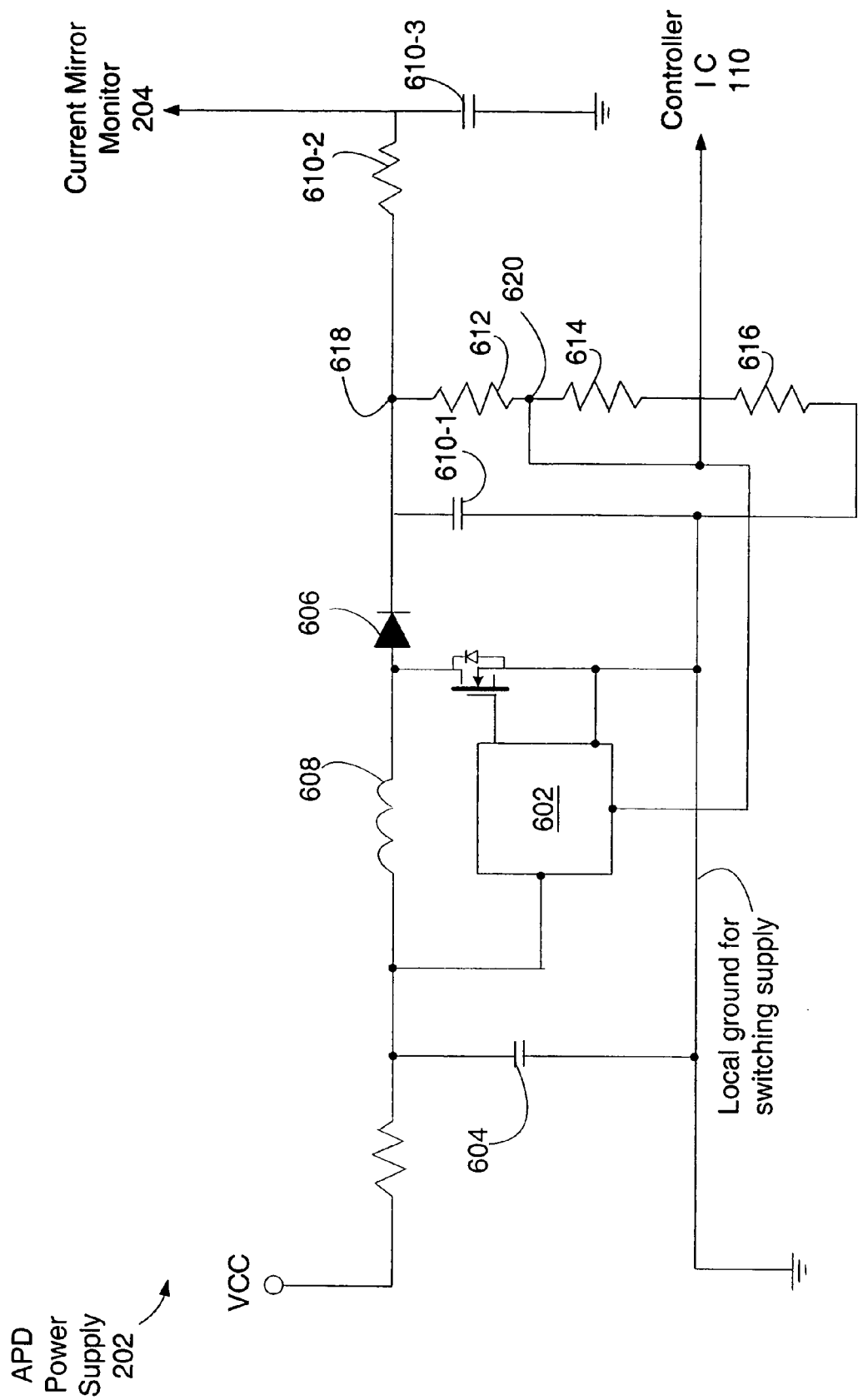
FIG. 6 is a circuit diagram of the avalanche photodiode power supply circuit in FIG. 4.

FIG. 6 is a circuit diagram of a power supply circuit 202 for an avalanche photodiode in an embodiment of the present invention. To accommodate a variety of avalanche photodiodes operating over a wide range of temperatures, the power supply must be capable of supplying up to 3 mA of current at voltages ranging from 40 volts to 70 volts. Since the voltage supplied to pluggable transceivers is typically 5 volts or 3.3 volts DC, depending on the specific application, an avalanche photodiode power supply must be a boost, DC-DC regulator, capable of converting a DC voltage of 3.3 volts up to 70 volts. A typical boost-regulator configuration is shown in FIG. 6, with a switch controller IC 602 that drives a p-channel FET transistor 603, a feedback loop consisting of a resistor divider network 612, 614 and 616 connected between node 618 and ground, an input bypassing capacitor 604, a blocking diode 606, an inductor 608, and an R-C output filter 610-1, 610-2 and 610-3. The resistor divider network 612, 614 and 616 is tapped between resistor 612 and resistor 614, and the tapped voltage is connected to the monitor pin on the switch controller IC 602. In the example shown in FIG. 6, the switch controller IC 602 is a PWM-type so that as the feedback voltage rises or dips from the reference value, the duty factor of the switch is decreased or increased respectively to regulate the output at the proper level.

Resistor 610-2 increases the dynamic range of the avalanche photodiode 206 by providing a voltage drop that is proportional to the current through the avalanche photodiode and hence to the intensity of the optical signals received by the avalanche photodiode. The voltage drop reduces the reverse bias voltage for the avalanche photodiode, and in turn reduces the current gain in the photodiode and consequently limits the current through the avalanche photodiode to prevent the avalanche photodiode from being overloaded by strong optical signals. The use of a resistor placed in series with an avalanche photodiode to increase the dynamic range of the avalanche photodiode is described in co-pending United States provisional application Ser. No. 60/355,024 entitled High Dynamic Range Optical Signal Receiver, filed Feb. 8, 2002, which is hereby incorporated by reference. Other means for increasing the dynamic range of an avalanche photodiode may also be used.

The avalanche photodiode power supply also must provide a means by which the reverse-bias voltage $V_{APD}$ can be set during the operation and calibration of the optoelectronic transceiver 100. In one embodiment, the transceiver controller IC 110 adjusts the voltage level in the feedback loop of the power supply by connecting one of the digital to analog converter/current-sinks of the controller IC 110 to a voltage divider node 620 in the feedback loop of the avalanche power supply.

Figure 7:
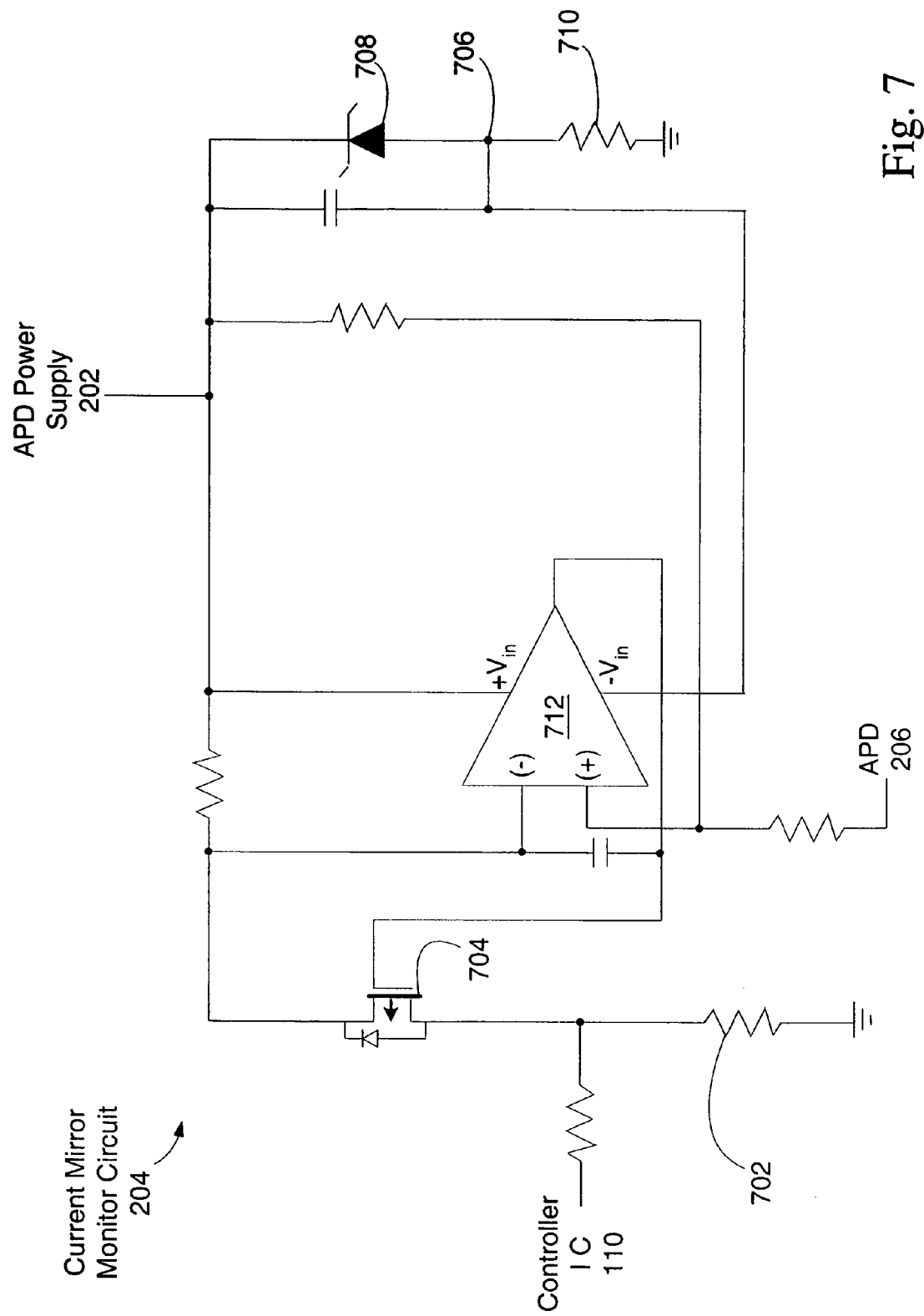
FIG. 7 is a circuit diagram of the circuit mirror monitor circuit in FIG. 4.

FIG. 7 is a circuit diagram of a current mirror monitor circuit 204 for measuring the current through an avalanche photodiode. Since the avalanche photodiode current is proportional to the power of the incident light, measuring the avalanche photodiode current is a means for monitoring the received power. In the embodiment shown in FIG. 7, the avalanche photodiode current is mirrored through a sense resistor 702 connected to ground. The voltage across the sense resistor 702 is proportional to the avalanche photodiode current, and this voltage is monitored by connecting one of the analog to digital converters in the transceiver controller IC 110 to the top of the sense resistor. The controller IC 110 applies a calibration value for the reverse-bias current to the avalanche photodiode 206, and the controller IC 110 reports the calibration value via the serial interface 121 during the calibration of the transceiver.

The current mirror monitor circuit 204 must be capable of withstanding a maximum avalanche photodiode voltage of 70 volts and a maximum current of 3 mA. In the embodiment shown in FIG. 7, an operational amplifier (opamp) 712 is used to mirror the current. The opamp 712 is arranged so that it tries to maintain equal current on both branches of the current mirror by driving a FET 704 on the sense side. Since many opamps are designed to have a supply voltage of 5 volts, the supply voltage to the opamp 712 is made to float with the positive supply set to the avalanche photodiode voltage, and the negative supply is made to float 5 volts below this level. The negative supply is made to float in this manner by connecting it to a node 706 between a zener diode 708 and a resistor 710. This zener-resistor network is connected between the avalanche photodiode voltage and ground. In other embodiments, matched transistors may be used, provided that the matched transistor pairs are selected so that they can withstand a collector-emitter voltage greater than the maximum avalanche photodiode voltage.

Figure 8:
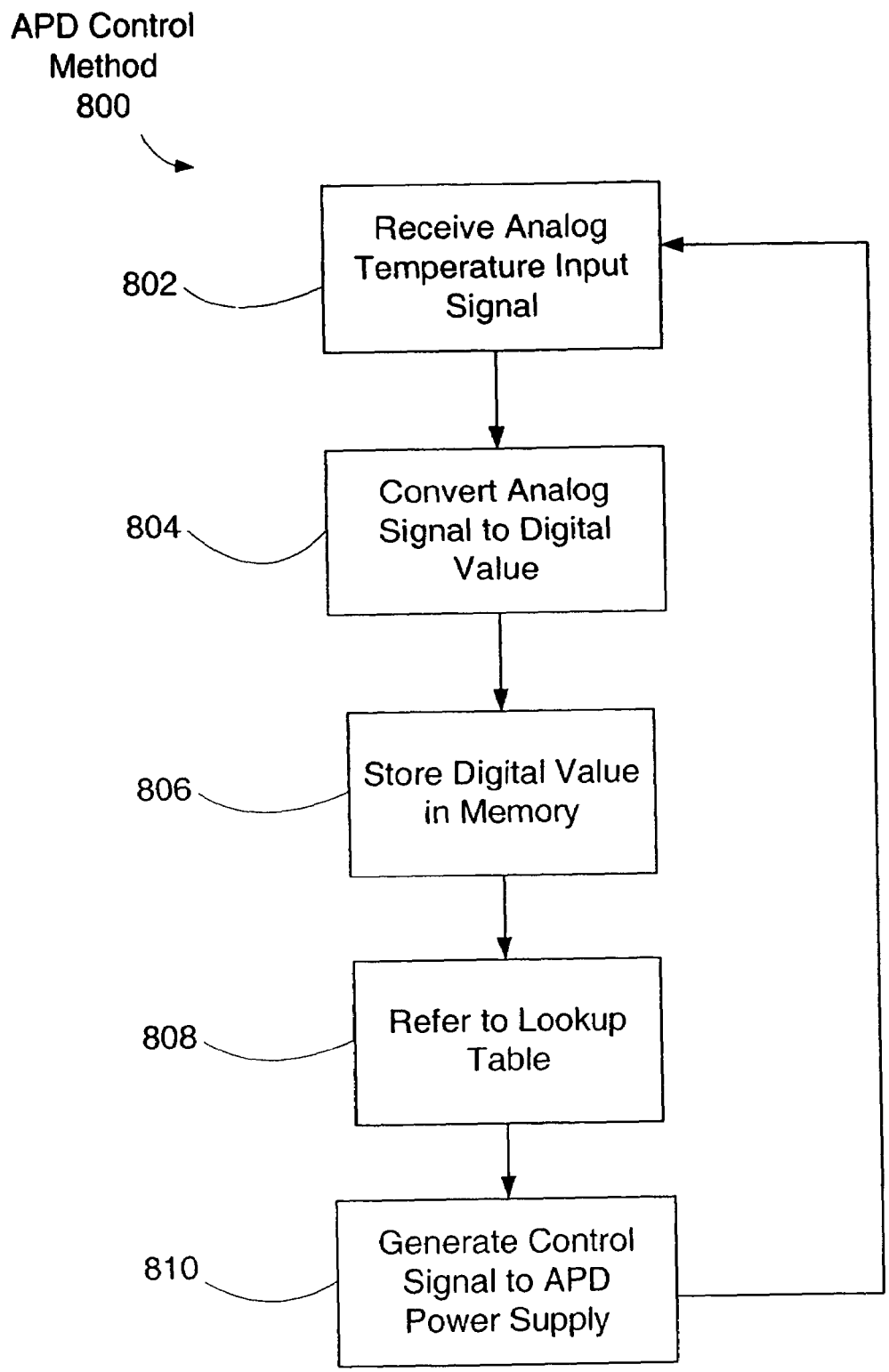
FIG. 8 is a flowchart of a method for controlling the reverse-bias voltage applied to an avalanche photodiode in accordance with an embodiment of the present invention.

FIG. 8 illustrates a method for controlling the reverse-bias voltage for an avalanche photodiode in accordance with an embodiment of this invention. During operation of the avalanche photodiode 206, an analog signal from the temperature sensor 210 is received by the controller IC 110 in step 802 and converted to a digital temperature value in step 804. The digital value is stored in the General Purpose EEPROM 120 (FIG. 3) in step 806. In step 808 logic in the controller IC determines a digital control value associated with the reverse-bias voltage for the avalanche photodiode 206 based on the digital temperature value and the entry for the control value in the temperature lookup table 122 (FIG. 3) associated with the digital value for the temperature. If the digital temperature value falls between two entries in the temperature lookup table, the control value is preferably generated using interpolation (e.g., linear interpolation) to compute a control value between the control values in the two entries Alternatively, a closest entry is selected and its digital control value is used. In step 510 digital to analog circuitry 123 converts the digital control value into an analog control signal that is transmitted to the power supply 202 to control the avalanche photodiode 206.

Figure 9:
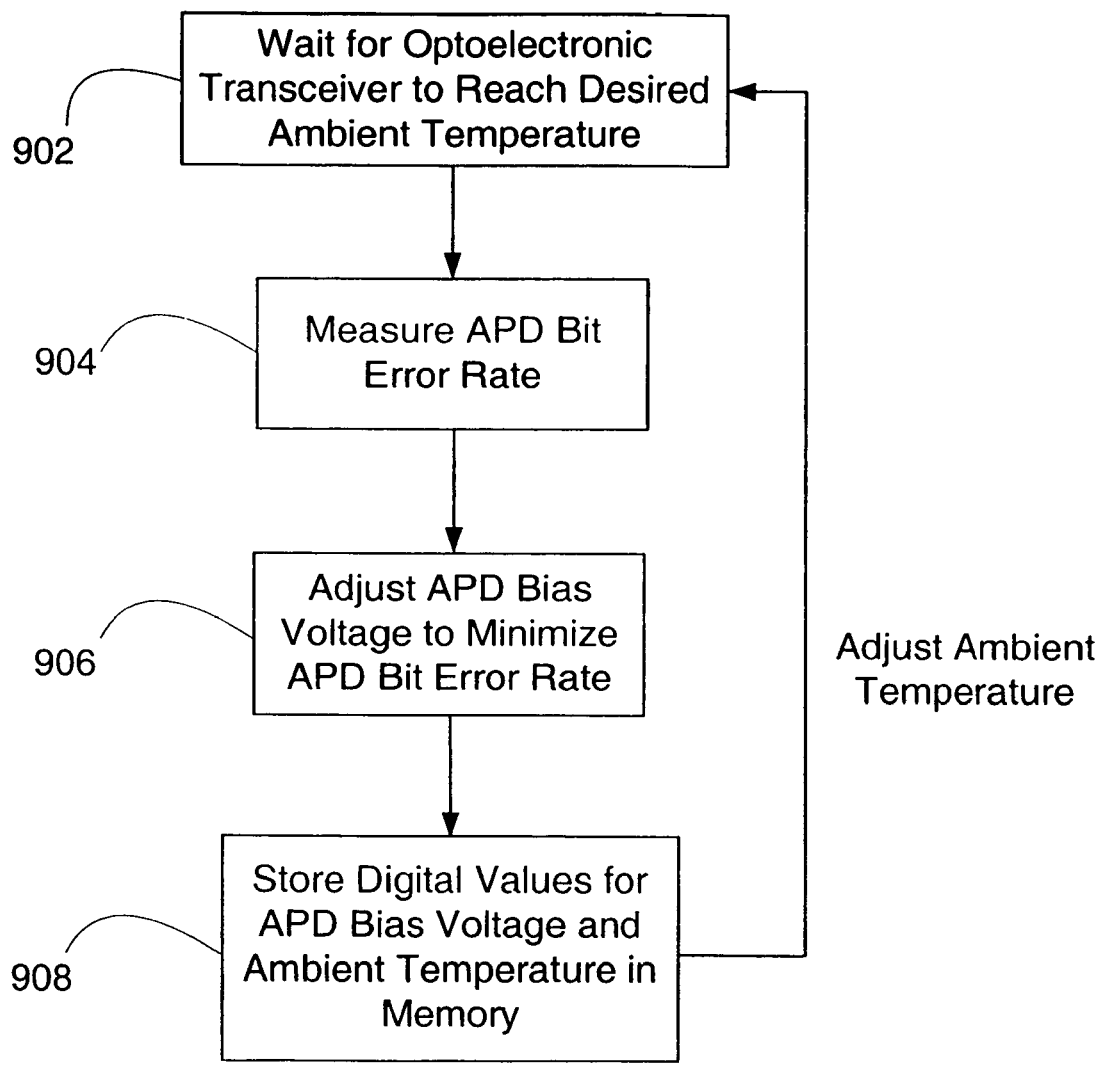
FIG. 9 is a flowchart of a method for calibrating an optoelectronic transceiver having an avalanche photodiode in accordance with an embodiment of the present invention.

The entries in the temperature lookup table 122 (FIG. 3) are determined during calibration of the optoelectronic transceiver 100. FIG. 9 is a flow-chart of a method for calibrating an optoelectronic transceiver in accordance with an embodiment of the present invention. First, in step 902 the ambient temperature of the optoelectronic transceiver 100 is allowed to reach a particular value. Next in step 904, the bit error rate for the optoelectronic transceiver is measured using techniques that are well-known to those skilled in the art. In step 906, the controller IC causes the reverse-bias voltage applied to the avalanche photodiode 206 to be adjusted until the bit error rate is minimized. The reverse-bias voltage which minimizes the bit error rate is the optimal reverse-bias voltage. A control value associated with the optimal reverse-bias voltage is stored in a temperature lookup table 122 (FIG. 3) in the controller IC 110 along with the temperature in step 908. The ambient temperature of the optoelectronic transceiver 100 is then adjusted (by heating it in an oven, for example), and the process repeated to determine a control value for one or more other temperatures. Control values for additional temperatures may be assigned by interpolation or extrapolation and stored in the temperature lookup table.

Figure 10:
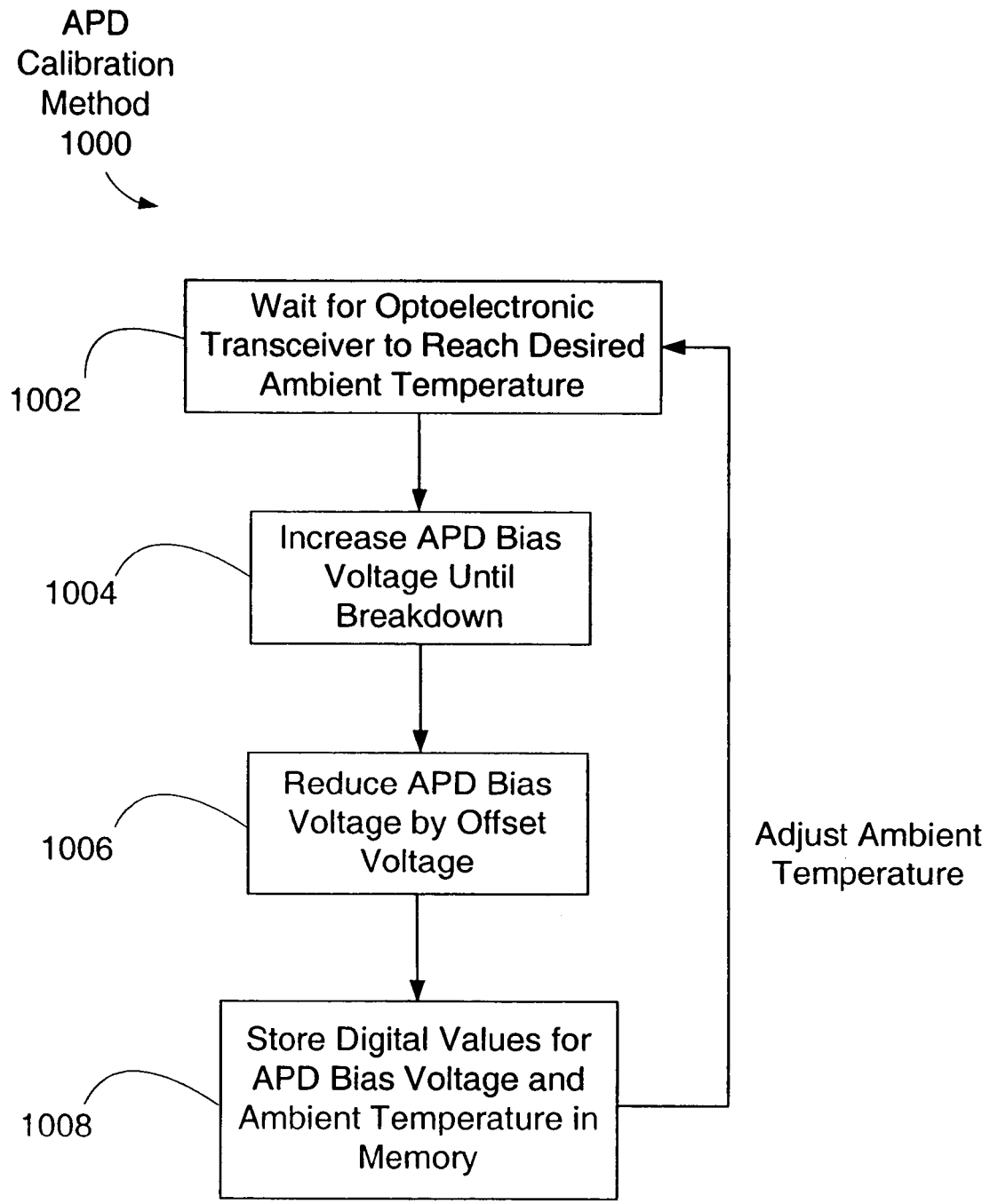
FIG. 10 is a flowchart of a method for calibrating an optoelectronic transceiver having an avalanche photodiode in accordance with another embodiment of the present invention.

FIG. 10 is a flow-chart of another method for calibrating an optoelectronic transceiver in accordance with another embodiment of the present invention. As in the method illustrated in FIG. 9, the first step 1002 involves allowing the ambient temperature of the optoelectronic transceiver 100 is allowed to reach a particular value. Next in step 1004, the controller IC causes the reverse-bias voltage applied to the avalanche photodiode 206 to increase until the current mirror signal from the current mirror monitor circuit 204 increases abruptly, which indicates the occurrence of an avalanche breakdown. The reverse-bias voltage at which the avalanche breakdown occurred is reduced by an offset voltage in step 1006 to provide an approximate optimal reverse-bias voltage. A control value associated with the approximate optimal reverse-bias voltage determined in step 1006 is stored in a temperature lookup table 122 (FIG. 3) in the controller IC 110 along with the temperature in step 1008. As with the method illustrated in FIG. 9, the ambient temperature of the optoelectronic transceiver 100 is then adjusted (by heating it in an oven, for example), and the process repeated to determine a control value for one or more other temperatures. Control values for additional temperatures may be assigned by interpolation or extrapolation and stored in the temperature lookup table.

TABLE 1

MEMORY MAP FOR TRANSCEIVER CONTROLLER

| Memory Location (Array 0) | Name of Location | Function |
|---|---|---|
| 00h–5Fh | IEEE Data | This memory block is used to store required GBIC data |
| 60h | Temperature MSB | This byte contains the MSB of the 15-bit 2's complement temperature output from the temperature sensor. |
| 61h | Temperature LSB | This byte contains the LSB of the 15-bit 2's complement temperature output from the temperature sensor. (LSB is 0b). |
| 62h–63h | $V_{cc}$ Value | These bytes contain the MSB (62h) and the LSB (63h) of the measured $V_{cc}$ (15-bit number, with a 0b LSbit) |
| 64h–65h | $B_{in}$ Value | These bytes contain the MSB (64h) and the LSB (65h) of the measured $B_{in}$ (15-bit number, with a 0b LSbit) |
| 66h–67h | $P_{in}$ Value | These bytes contain the MSB (66h) and the LSB (67h) of the measured $P_{in}$ (15-bit number, with a 0b LSbit) |
| 68h–69h | $R_{in}$ Value | These bytes contain the MSB (68h) and the LSB (69h) of the measured $R_{in}$ (15-bit number, with a 0b LSbit) |
| 6Ah–6Dh | Reserved | Reserved |
| 6Eh | IO States | This byte shows the logical value of the I/O pins. |
| 6Fh | A/D Updated | Allows the user to verify if an update from the A/D has occurred to the 5 values: temperature, Vcc, $B_{in}$, $P_{in}$ and $R_{in}$. The user writes the byte to 00h. Once a conversion is complete for a give value, its bit will change to '1'. |
| 70h–73h | Alarm Flags | These bits reflect the state of the alarms as a conversion updates. High alarm bits are '1' if converted value is greater than corresponding high limit. Low alarm bits are '1' if converted value is less than corresponding low limit. Otherwise, bits are 0b. |
| 74h–77h | Warning Flags | These bits reflect the state of the warnings as a conversion updates. High warning bits are '1' if converted value is greater than corresponding high limit. Low warning bits are '1' if converted value is less than corresponding low limit. Otherwise, bits are 0b. |
| 78h–7Ah | Reserved | Reserved |
| 7Bh–7Eh | Password Entry Bytes PWE Byte 3 (7Bh) MSByte PWE Byte 2 (7Ch) PWE Byte 1 (7Dh) PWE Byte 0 (7Eh) LSByte | The four bytes are used for password entry. The entered password will determine the user's read/write privileges. |
| 7Fh | Array Select | Writing to this byte determines which of the upper pages of memory is selected for |

TABLE 1-continued

MEMORY MAP FOR TRANSCEIVER CONTROLLER

| | | |
|---|---|---|
| 80h–F7h | | reading and writing.<br>0xh (Array x Selected)<br>Where x = 1, 2, 3, 4 or 5<br>Customer EEPROM |
| 87h | DA % Adj | Scale output of D/A converters by specified percentage |

| | Name of Location | Function of Location |
|---|---|---|
| Memory Location (Array 1) | | |
| 00h–FFh | | Data EEPROM |
| Memory Location (Array 2) | | |
| 00h–FFh | | Data EEPROM |
| Memory Location (Array 3) | | |
| 80h–81h | Temperature High Alarm | The value written to this location serves as the high |
| 88h–89h | Vcc High Alarm | alarm limit. Data format is the same as the |
| 90h–91h | $B_{in}$ High Alarm | corresponding value (temperature, Vcc, $B_{in}$ $P_{in}$ $R_{in}$). |
| 98h–99h | $P_{in}$ High Alarm | |
| A0h–A1h | $R_{in}$ High Alarm | |
| 82h–83h | Temperature Low Alarm | The value written to this location serves as the low |
| 8Ah–8Bh | Vcc Low Alarm | alarm limit. Data format is the same as the |
| 92h–93h | $B_{in}$ Low Alarm | corresponding value (temperature, Vcc, $B_{in}$ $P_{in}$ $R_{in}$). |
| 9Ah–9Bh | $P_{in}$ Low Alarm | |
| A2h–A3h | $R_{in}$ Low Alarm | |
| 84h–85h | Temp High Warning | The value written to this location serves as the high |
| 8Ch–8Dh | Vcc High Warning | warning limit. Data format is the same as the |
| 94h–95h | $B_{in}$ High Warning | corresponding value (temperature, Vcc, $B_{in}$ $P_{in}$ $R_{in}$). |
| 9Ch–9Dh | $P_{in}$ High Warning | |
| A4h–A5h | $R_{in}$ High Warning | |
| 86h–87h | Temperature Low Warning | The value written to this location serves as the low |
| 8Eh–8Fh | Vcc Low Warning | warning limit. Data format is the same as the |
| 96h–97h | $B_{in}$ Low Warning | corresponding value (temperature, Vcc, $B_{in}$ $P_{in}$ $R_{in}$). |
| 9Eh–9Fh | $P_{in}$ Low Warning | |
| A6h–A7h | $R_{in}$ Low Warning | |
| A8h–AFh, C5h | $D_{out}$ control 0–8 | Individual bit locations are defined in Table 4. |
| B0h–B7h, C6h | $F_{out}$ control 0–8 | |
| B8h–BFh, C7h | $L_{out}$ control 0–8 | |
| C0h | Reserved | Reserved |
| C1h | Prescale | Selects MCLK divisor for X-delay CLKS. |
| C2h | $D_{out}$ Delay | Selects number of prescale clocks |
| C3h | $F_{out}$ Delay | |
| C4h | $L_{out}$ Delay | |
| C8h–C9h | Vcc - A/D Scale | 16 bits of gain adjustment for corresponding A/D |
| CAh–CBh | $B_{in}$ - A/D Scale | conversion values. |
| CCh–CDh | $P_{in}$ - A/D Scale | |
| CEh–CFh | $R_{in}$ - A/D Scale | |
| D0h | Chip Address | Selects chip address when external pin ASEL is low. |
| D1h | Margin #2 | Finisar Selective Percentage (FSP) for D/A #2 |
| D2h | Margin #1 | Finisar Selective Percentage (FSP) for D/A #1 |
| D3h–D6h | PW1 Byte 3 (D3h) MSB<br>PW1 Byte 2 (D4h)<br>PW1 Byte 1 (D5h)<br>PW1 Byte 0 (D6h) LSB | The four bytes are used for password 1 entry. The entered password will determine the Finisar customer's read/write privileges. |
| D7h | D/A Control | This byte determines if the D/A outputs source or sink current, and it allows for the outputs to be scaled. |
| D8h–DFh | $B_{in}$ Fast Trip | These bytes define the fast trip comparison over temperature. |
| E0h–E3h | $P_{in}$ Fast Trip | These bytes define the fast trip comparison over temperature. |
| E4h–E7h | $R_{in}$ Fast Trip | These bytes define the fast trip comparison over temperature. |
| E8h | Configuration Override Byte | Location of the bits is defined in Table 4 |
| E9h | Reserved | Reserved |

TABLE 1-continued

MEMORY MAP FOR TRANSCEIVER CONTROLLER

| | | |
|---|---|---|
| EAh–EBh | Internal State Bytes | Location of the bits is defined in Table 4 |
| ECh | I/O States 1 | Location of the bits is defined in Table 4 |
| EDh–EEh | D/A Out | Magnitude of the temperature compensated D/A outputs |
| EFh | Temperature Index | Address pointer to the look-up Arrays |
| F0h–FFh | Reserved | Reserved |
| Memory Location (Array 4) | | |
| 00h–FFh | | D/A Current vs. Temp #1 (User-Defined Look-up Array #1) |
| Memory Location (Array 5) | | |
| 00h–FFh | | D/A Current vs. Temp #2 (User-Defined Look-up Array #2) |

TABLE 2

Detail Memory Descriptions - A/D Values and Status Bits

| Byte | Bit | Name | Description |
|---|---|---|---|
| Converted analog values. Calibrated 16 bit data. (See Notes 1–2) | | | |
| 96 (60 h) | All | Temperature MSB | Signed 2's complement integer temperature (−40 to +125 C.) Based on internal temperature measurement |
| 97 | All | Temperature LSB | Fractional part of temperature (count/256) |
| 98 | All | Vcc MSB | Internally measured supply voltage in transceiver. Actual voltage is full 16 bit value * 100 uVolt. |
| 99 | All | Vcc LSB | (Yields range of 0–6.55 V) |
| 100 | All | TX Bias MSB | Measured TX Bias Current in mA Bias current is full 16 bit value *(1/256) mA. |
| 101 | All | TX Bias LSB | (Full range of 0–256 mA possible with 4 uA resolution) |
| 102 | All | TX Power MSB | Measured TX output power in mW. Output is full 16 bit value *(1/2048) mW. (see note 5) |
| 103 | All | TX Power LSB | (Full range of 0–32 mW possible with 0.5 μW resolution, or −33 to +15 dBm) |
| 104 | All | RX Power MSB | Measured RX input power in mW RX power is full 16 bit value *(1/16384) mW. (see note 6) |
| 105 | All | RX Power LSB | (Full range of 0–4 mW possible with 0.06 μW resolution, or −42 to +6 dBm) |
| 106 | All | Reserved MSB | Reserved for 1st future definition of digitized analog input |
| 107 | All | Reserved LSB | Reserved for 1st future definition of digitized analog input |
| 108 | All | Reserved MSB | Reserved for 2nd future definition of digitized analog input |
| 109 | All | Reserved LSB | Reserved for 2nd future definition of digitized analog input |
| General Status Bits | | | |
| 110 | 7 | TX Disable | Digital state of the TX Disable Input Pin |
| 110 | 6 | Reserved | |
| 110 | 5 | Reserved | |
| 110 | 4 | Rate Select | Digital state of the SFP Rate Select Input Pin |
| 110 | 3 | Reserved | |
| 110 | 2 | TX Fault | Digital state of the TX Fault Output Pin |
| 110 | 1 | LOS | Digital state of the LOS Output Pin |
| 110 | 0 | Power-On-Logic | Indicates transceiver has achieved power up and data valid |
| 111 | 7 | Temp A/D Valid | Indicates A/D value in Bytes 96/97 is valid |
| 111 | 6 | Vcc A/D Valid | Indicates A/D value in Bytes 98/99 is valid |
| 111 | 5 | TX Bias A/D Valid | Indicates A/D value in Bytes 100/101 is valid |
| 111 | 4 | TX Power A/D Valid | Indicates A/D value in Bytes 102/103 is valid |
| 111 | 3 | RX Power A/D Valid | Indicates A/D value in Bytes 104/105 is valid |
| 111 | 2 | Reserved | Indicates A/D value in Bytes 106/107 is valid |

TABLE 2-continued

Detail Memory Descriptions - A/D Values and Status Bits

| Byte | Bit | Name | Description |
| --- | --- | --- | --- |
| 111 | 1 | Reserved | Indicates A/D value in Bytes 108/109 is valid |
| 111 | 0 | Reserved | Reserved |

TABLE 3

Detail Memory Descriptions - Alarm and Warning Flag Bits
Alarm and Warning Flag Bits

| Byte | Bit | Name | Description |
| --- | --- | --- | --- |
| 112 | 7 | Temp High Alarm | Set when internal temperature exceeds high alarm level. |
| 112 | 6 | Temp Low Alarm | Set when internal temperature is below low alarm level. |
| 112 | 5 | Vcc High Alarm | Set when internal supply voltage exceeds high alarm level. |
| 112 | 4 | Vcc Low Alarm | Set when internal supply voltage is below low alarm level. |
| 112 | 3 | TX Bias High Alarm | Set when TX Bias current exceeds high alarm level. |
| 112 | 2 | TX Bias Low Alarm | Set when TX Bias current is below low alarm level. |
| 112 | 1 | TX Power High Alarm | Set when TX output power exceeds high alarm level. |
| 112 | 0 | TX Power Low Alarm | Set when TX output power is below low alarm level. |
| 113 | 7 | RX Power High Alarm | Set when Received Power exceeds high alarm level. |
| 113 | 6 | RX Power Low Alarm | Set when Received Power is below low alarm level. |
| 113 | 5–0 | Reserved Alarm | |
| 114 | All | Reserved | |
| 115 | All | Reserved | |
| 116 | 7 | Temp High Warning | Set when internal temperature exceeds high warning level. |
| 116 | 6 | Temp Low Warning | Set when internal temperature is below low warning level. |
| 116 | 5 | Vcc High Warning | Set when internal supply voltage exceeds high warning level. |
| 116 | 4 | Vcc Low Warning | Set when internal supply voltage is below low warning level. |
| 116 | 3 | TX Bias High Warning | Set when TX Bias current exceeds high warning level. |
| 116 | 2 | TX Bias Low Warning | Set when TX Bias current is below low warning level. |
| 116 | 1 | TX Power High Warning | Set when TX output power exceeds high warning level. |
| 116 | 0 | TX Power Low Warning | Set when TX output power is below low warning level. |
| 117 | 7 | RX Power High Warning | Set when Received Power exceeds high warning level. |
| 117 | 6 | RX Power Low Warning | Set when Received Power is below low warning level. |
| 117 | 5 | Reserved Warning | |
| 117 | 4 | Reserved Warning | |
| 117 | 3 | Reserved Warning | |
| 117 | 2 | Reserved Warning | |
| 117 | 1 | Reserved Warning | |
| 117 | 0 | Reserved Warning | |
| 118 | All | Reserved | |
| 119 | All | Reserved | |

TABLE 4

| Byte Name | Bit 7 | Bit 6 | Bit 5 | Bit 4 | Bit 3 | Bit 2 | Bit 1 | Bit 0 |
| --- | --- | --- | --- | --- | --- | --- | --- | --- |
| X-out cntl0 | T alrm hi set | T alrm lo set | V alrm hi set | V alrm lo set | B alrm hi set | B alrm lo set | P alrm hi set | P alrm lo set |
| X-out cntl1 | R alrm hi set | R alrm lo set | B ft hi set | P ft hi set | R ft hi set | D-in inv set | D-in set | F-in inv set |

TABLE 4-continued

| Byte Name | Bit 7 | Bit 6 | Bit 5 | Bit 4 | Bit 3 | Bit 2 | Bit 1 | Bit 0 |
|---|---|---|---|---|---|---|---|---|
| X-out cntl2 | F-in set | L-in inv set | L-in set | Aux inv set | Aux set | T alrm hi hib | T alrm lo hib | V alrm hi hib |
| X-out cntl3 | V alrm lo hib | B alrm hi hib | B alrm lo hib | P alrm hi hib | P alrm lo hib | R alrm hi hib | R alrm lo hib | B ft hi hib |
| X-out cntl4 | P ft hi hib | R ft hi hib | D-in inv hib | D-in hib | F-in inv hib | F-in hib | L-in inv hib | L-in hib |
| X-out cntl5 | Aux inv hib | Aux hib | T alrm hi clr | T alrm lo clr | V alrm hi clr | V alrm lo clr | B alrm hi clr | B alrm lo clr |
| X-out cntl6 | P alrm hi clr | P alrm lo clr | R alrm hi clr | R alrm lo clr | B ft hi clr | P ft hi clr | R ft hi clr | D-in inv clr |
| X-out cntl7 | D-in clr | F-in inv clr | F-in clr | L-in inv clr | L-in clr | Aux inv clr | Aux clr | EE |
| X-out cntl8 | latch select | invert | o-ride data | o-ride select | S reset data | HI enable | LO enable | Pullup enable |
| Prescale | reserved | reserved | Reserved | reserved | $B^3$ | $B^2$ | $B^1$ | $B^0$ |
| X-out delay | $B^7$ | $B^6$ | $B^5$ | $B^4$ | $B^3$ | $B^2$ | $B^1$ | $B^0$ |
| chip address | $b^7$ | $b^6$ | $b^5$ | $b^4$ | $b^3$ | $b^2$ | $b^1$ | X |
| X-ad scale MSB | $2^{15}$ | $2^{14}$ | $2^{13}$ | $2^{12}$ | $2^{11}$ | $2^{10}$ | $2^9$ | $2^8$ |
| X-ad scale LSB | $2^7$ | $2^6$ | $2^5$ | $2^4$ | $2^3$ | $2^2$ | $2^1$ | $2^0$ |
| D/A cntl | source/sink 1/0 | $2^2$ | D/A #2 range $2^1$ | $2^0$ | source/sink 1/0 | $2^2$ | D/A #1 range $2^1$ | $2^0$ |
| config/O-ride | manual D/A | manual index | manual AD alarm | EE Bar | SW-POR | A/D Enable | Manual fast alarm | reserved |
| Internal State 1 | D-set | D-inhibit | D-delay | D-clear | F-set | F-inhibit | F-delay | F-clear |
| Internal State 0 | L-set | L-inhibit | L-delay | L-clear | reserved | reserved | reserved | reserved |
| I/O States 1 | reserved | F-in | L-in | reserved | D-out | reserved | reserved | reserved |
| Margin #1 | Reserved | Neg_Scale2 | Neg_Scale1 | Neg_Scale0 | Reserved | Pos_Scale2 | Pos_Scale1 | Pos_Scale0 |
| Margin #2 | Reserved | Neg_Scale2 | Neg_Scale1 | Neg_Scale0 | Reserved | Pos_Scale2 | Pos_Scale1 | Pos_Scale0 |

While the combination of all of the above functions is desired in some embodiments of this transceiver controller, it should be obvious to one skilled in the art having the benefit of this disclosure that a device which only implements a subset of these functions would also be of great use. Similarly, the present invention is also applicable to optoelectronic receivers, and thus is not solely applicable to transceivers. Finally, it should be pointed out that the controller of the present invention is suitable for application of multichannel optical links.

The foregoing descriptions of specific embodiments of the present invention are presented for purposes of illustration and explanation. The embodiments were chosen and described in order to best explain the principles of the invention and its practical applications, to thereby enable others skilled in the art to best utilize the invention. They are not intended to be exhaustive or to limit the invention to the precise forms disclosed. Various modifications may occur to those skilled in the art having the benefit of this disclosure without departing from the inventive concepts described herein. Accordingly, it is the claims, not merely the foregoing illustration, that are intended to define the exclusive rights of the invention.

What is claimed is:

1. A method for calibrating an optoelectronic assembly that includes an avalanche photodiode (APD), the method comprising:
   adjusting, at a first temperature of the optoelectronic assembly, a reverse-bias voltage of the APD until avalanche breakdown of the APD occurs;
   optimizing the reverse-bias voltage of the APD at the first temperature, based upon reducing, by a predetermined offset voltage, the reverse-bias voltage of the APD at which avalanche breakdown of the APD occurred; and
   storing, in association with each other, a control value corresponding to the optimized APD reverse-bias voltage and a first temperature.

2. The method as recited in claim 1, wherein the optimized APD reverse-bias voltage control value and the first temperature are stored in a temperature lookup table.

3. The method as recited in claim 1, wherein adjustment of the reverse-bias voltage until avalanche breakdown of the APD occurs is performed at least in part by the optoelectronic assembly.

4. The method as recited in claim 1, wherein the reverse-bias voltage of the APD is increased until avalanche breakdown of the APD occurs.

5. The method as recited in claim 1, wherein the optimized APD reverse-bias voltage control value and the first temperature are stored in the optoelectronic assembly.

6. The method as recited in claim 1, wherein the optimized APD reverse-bias voltage control value and the first temperature are both digital values.

7. The method as recited in claim 1, wherein the offset voltage is an order of magnitude smaller than the APD avalanche breakdown voltage.

8. The method as recited in claim 1, wherein the offset voltage varies with temperature of the optoelectronic assembly.

9. The method as recited in claim 1, wherein the offset voltage is substantially constant over a predetermined range of temperatures of the optoelectronic assembly.

10. The method as recited in claim 1, further comprising sensing avalanche breakdown of the APD.

11. The method as recited in claim 1, further comprising generating the value corresponding to the optimized APD reverse-bias voltage.

12. A method for calibrating an optoelectronic assembly that includes an avalanche photodiode (APD), the method comprising:
   adjusting, at a first temperature of the optoelectronic assembly, a reverse-bias voltage of the APD until avalanche breakdown of the APD occurs;
   optimizing the reverse-bias voltage of the APD at the first temperature, based upon the reverse-bias voltage of the APD at avalanche breakdown;
   storing, in association with each other, a control value corresponding to the optimized APD reverse-bias voltage and a first temperature;
   changing a temperature of the optoelectronic assembly from the first temperature to a second temperature, wherein changing the optoelectronic assembly from the first temperature to the second temperature comprises performing one of the following:
      heating the optoelectronic assembly until the optoelectronic assembly reaches the second temperature; or,
      cooling the optoelectronic assembly until the optoelectronic assembly reaches the second temperature; and
   performing the adjusting, determining and storing processes for the second temperature.

13. The method as recited in claim 12, further comprising interpolating between the optimized APD reverse-bias voltage control value corresponding to the first temperature and the optimized APD reverse-bias voltage control value corresponding to the second temperature, to determine an optimized APD reverse-bias voltage control value corresponding to a third temperature.

14. The method as recited in claim 13, further comprising storing, in association with each other, the optimized APD reverse-bias voltage control value corresponding to the third temperature, and the third temperature.

15. The method as recited in claim 12, further comprising extrapolating from the optimized APD reverse-bias voltage control value corresponding to the first temperature and the optimized APD reverse-bias voltage control value corresponding to the second temperature, to determine an optimized APD reverse-bias voltage control value corresponding to a third temperature.

16. The method as recited in claim 15, further comprising storing, in association with each other, the optimized APD reverse-bias voltage control value corresponding to the third temperature, and the third temperature.

17. The method as recited in claim 12, wherein the optimized APD reverse-bias voltage control value and the first temperature are stored in a temperature lookup table.

18. The method as recited in claim 12, wherein the optimized APD reverse-bias voltage control value and the first temperature are stored in the optoelectronic assembly.

19. The method as recited in claim 12, wherein adjustment of the reverse-bias voltage until avalanche breakdown of the APD occurs is performed at least in part by the optoelectronic assembly.

20. The method as recited in claim 12, wherein the reverse-bias voltage of the APD is increased until avalanche breakdown of the APD occurs.

* * * * *

UNITED STATES PATENT AND TRADEMARK OFFICE
CERTIFICATE OF CORRECTION

PATENT NO. : 7,217,914 B2  Page 1 of 1
APPLICATION NO. : 10/899904
DATED : May 15, 2007
INVENTOR(S) : Stewart et al.

It is certified that error appears in the above-identified patent and that said Letters Patent is hereby corrected as shown below:

Column 4
Line 6, remove [212]
Line 12, change "111" to --110--
Line 33, change "120, 121, 122" to --120, 122, 128--
Line 47, change "are flags stored" to --is flag storage--
Line 48, change "that are" to --that is--

Column 5
Line 34, change "106" to --102--

Column 6
Line 7, after "housing", remove [212 (FIG. 2)]
Line 58, change "maybe" to --may be--
Line 59, remove [212]

Column 7
Line 20, remove [603]

Column 9
Lines 9-10, remove [is allowed]

Signed and Sealed this

Twenty-third Day of March, 2010

David J. Kappos
*Director of the United States Patent and Trademark Office*